2 Sheets--Sheet 1.

P. C. SAWYER.

Cotton-Gins.

No. 6,169. Reissued Dec. 8, 1874.

WITNESSES

Henry N Miller

C. L. Emerk.

INVENTOR

Peter C. Sawyer per Alexander Mason

Attorneys

2 Sheets--Sheet 2.

P. C. SAWYER.

Cotton-Gins.

No. 6,169. Reissued Dec. 8, 1874.

WITNESSES

Henry N. Miller

C. L. Ewert

INVENTOR

Peter C. Sawyer, per

Alexander Mason

Attorneys

UNITED STATES PATENT OFFICE.

PETER C. SAWYER, OF MACON, GEORGIA.

IMPROVEMENT IN COTTON-GINS.

Specification forming part of Letters Patent No. 139,820, dated June 10, 1873; reissue No. 6,169, dated December 8, 1874; application filed November 12, 1874.

*To all whom it may concern:*

Be it known that I, PETER C. SAWYER, of Macon, in the county of Bibb and State of Georgia, have invented certain new and useful Improvements in Cotton-Gins; and I do hereby declare that the following is a full, clear, and exact description thereof, reference being had to the accompanying drawings, and to the letters of reference marked thereon, which form a part of this specification.

My invention relates particularly to the cotton-box or hopper of a cotton-gin; and it consists in the construction of the swinging front, cotton-board, and ribs, to form the main portion of the cotton-box perfectly round without any sharp corners; also, in constructing the end walls of the cotton-box inclined inward from front to rear; also, in hinging the cotton-box at its top to a serrated bar, which is slotted and secured by bolts, for the forward and backward adjustment of the top of the box, and the box adjusted outward and inward at its bottom by a slotted block or blocks. My invention further consists in the swinging front, hinged at its upper end, and made adjustable both at the upper and lower ends; and, also, in ribs attached to the swinging front and curved in opposite directions, all as hereinafter more fully set forth.

In order to enable others skilled in the art to which my invention appertains to make and use the same, I will now proceed to describe its construction and operation, referring to the annexed drawings, in which—

Figure 1:
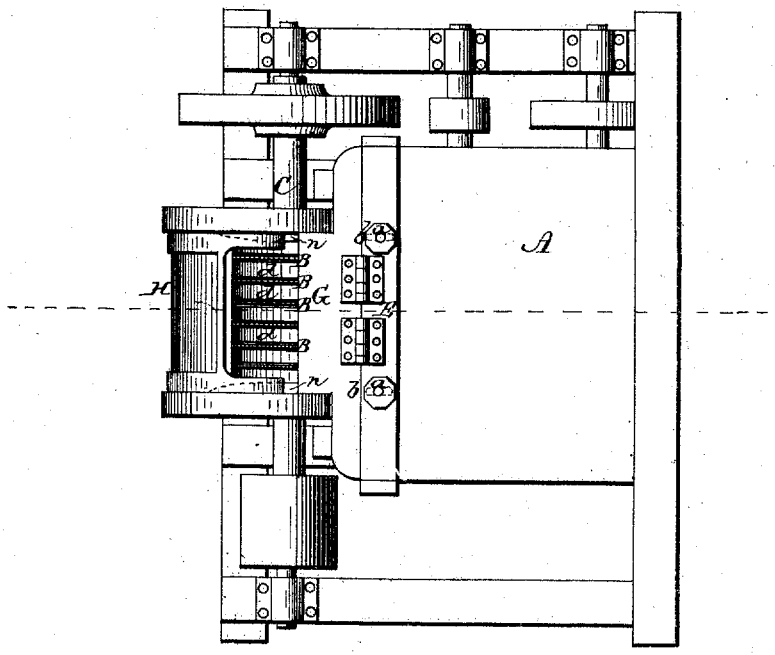
Figure 3:
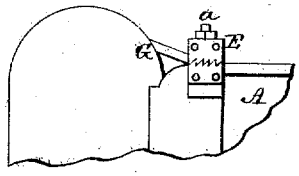
Figure 2:
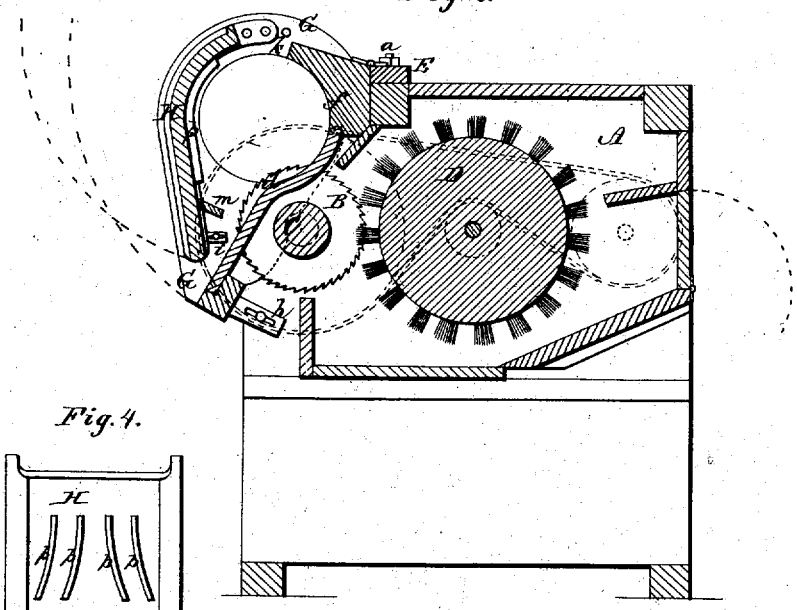
Figure 4:
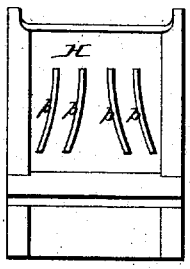

Figure 1 is a plan view, and Fig. 2 a longitudinal vertical section, of a cotton-gin embodying my invention. Figs. 3 and 4 are views showing detached parts of the same.

A represents the frame of a cotton-gin. B B are the saws, placed on the shaft C, and D represents the rotating stripping-brush, the shaft of which is parallel with the saw-shaft. These parts may be constructed and arranged in any of the known and usual ways. G represents the cotton-box or hopper, the upper end of which is hinged to a bar, E, and this bar attached, by means of bolts *a a*, to the frame A above and in rear of the saw-shaft. The bolts *a a* pass through slots *b b* in the bar E, so that the same may be moved backward or forward and held at any point desired, so as to adjust the upper end of the cotton-box to correspond with the adjustment of its lower end, as hereinafter described. At each end of the bar E, on the under side, are formed ratchet-teeth *e e*, which engage with similar teeth formed on the frame, thus holding the bar firmly in whatever position desired. To the lower part of the box or hopper G are attached the ribs *d d*, which fit in between the saws B B, the lower part of said ribs being straight and the upper part curved, as shown in Fig. 2, and attached to the cotton-board *f*, which forms the upper part of the hopper, or, in other words, connects the sides of the same. The lower end of the cotton-box or hopper G is supported and adjusted by means of slotted rests *h*, which are provided with ratchet-teeth, and held in any desired position by bolts. By moving the rests *h h* out or in, the angle at which the hopper hangs is correspondingly changed; but, if this were done without any change in the location of the upper part of the hopper, the distance the saws were to project above the ribs *d d* could not be properly regulated; but by making the upper part of the hopper adjustable, as above described, by means of the slotted bar E, the whole can be regulated in any manner desired. H represents the front of the cotton-box, which is hung in the sides of the box on a line above the saw-shaft, leaving an opening, *k*, between it and the cotton-board *f* for feeding the cotton. The lower end of the swinging front H is supported and adjusted by slotted ratchet-blocks *i*, and is provided with a seed-board, *m*, on the inner side, near the lower end, as shown in Fig. 2. The upper part of the swinging front H, the inner side of the cotton-board *f*, and the upper parts of the ribs *d d* are curved in such a manner as to form the interior of the roll-box perfectly round, without any sharp corners or abutments, thereby preventing the cotton-roll from clogging. The interior of the box is also made in such a manner as to be wider at the front than at the rear, the sides of the box being made or provided with inclined pieces *n n*, as shown in Fig. 1. This allows the cotton-roll, as it falls from the rear to the front, to expand or spread, and thus every time present a new surface to the saws. To facilitate this expanding or spreading of the roll, I attach ribs *p p* to the inner or under side of the swinging front H, which ribs are arranged to incline from the center toward both sides, as shown in Fig. 4. The upper or hinged end of the swinging front H is also adjustable by means of a series of holes, so that the point at which it is hinged may be changed, as desired, according to the condition of the cotton to be passed through the gin.

Having thus fully described my invention, what I claim as new, and desire to secure by Letters Patent, is—

1. The front H, with interior curve, the cotton-board *f*, with interior curve, and the curved upper portion of the ribs *d*, combined and forming the major part of a circle in the roll-box, so that the cotton is ginned by the saws in a circular roll, substantially as set forth.

2. The cotton-box D, having its end walls inclined from front to rear, as shown and described, whereby the cotton, after being fed through the top opening, will be acted upon by the saws, carried around, and be expanded in the front of the box, as and for the purposes set forth.

3. The cotton-box G, hinged at its top to the serrated bar E, which is slotted and secured by bolts for the forward and backward adjustment of the top of the box, said box being adjusted outward and inward at its bottom by the slotted block or blocks *h h*, all substantially as and for the purposes set forth.

4. The swinging front H, hinged at its upper end, and both the upper and lower ends made adjustable, substantially in the manner and for the purposes herein set forth.

5. The ribs *p p*, curved in opposite directions, and attached to the swinging front H of the cotton-box, as and for the purposes set forth.

In testimony that I claim the foregoing I have hereunto set my hand.

PETER C. SAWYER.

Witnesses:

C. L. EVERT,

JOHN SMITH.